(12) United States Patent
Chen et al.

(10) Patent No.: US 6,883,587 B2
(45) Date of Patent: Apr. 26, 2005

(54) POLYISOCYANATE COMPOSITIONS AND THEIR USE

(75) Inventors: Chia-hung Chen, Dublin, OH (US); Jorg Kroker, Hilliard, OH (US)

(73) Assignee: Ashland Inc., Dublin, OH (US)

( * ) Notice: Subject to any disclaimer, the term of this patent is extended or adjusted under 35 U.S.C. 154(b) by 167 days.

(21) Appl. No.: 10/075,975

(22) Filed: Feb. 14, 2002

(65) Prior Publication Data

US 2003/0173055 A1 Sep. 18, 2003

(51) Int. Cl.[7] .............................. B22C 1/22; B22C 9/00
(52) U.S. Cl. ....................... 164/526; 164/528; 164/529; 523/143; 523/139
(58) Field of Search ................................ 164/526, 528, 164/529; 523/143, 139

(56) References Cited

U.S. PATENT DOCUMENTS

| | | | | |
|---|---|---|---|---|
| 4,294,719 A | * | 10/1981 | Wagner et al. | 252/182.22 |
| 4,332,716 A | * | 6/1982 | Shah | 521/137 |
| 4,612,054 A | | 9/1986 | Hamon | 106/264 |
| 5,733,959 A | * | 3/1998 | Heitz et al. | 524/195 |
| 6,143,702 A | | 11/2000 | Nadasdi | 508/550 |
| 6,288,139 B1 | * | 9/2001 | Skoglund | 523/143 |

OTHER PUBLICATIONS

"2–Chloro–1,3–dimethylimidazolinium chloride. 1. A Powerful Dehydrating Equivalent to DCC" by Toshio Isobe. J. Org. Chem 1999, 64, 6984–6988.

* cited by examiner

*Primary Examiner*—Kiley S. Stoner
*Assistant Examiner*—I. H. Lin
(74) *Attorney, Agent, or Firm*—David L. Hedden

(57) ABSTRACT

This invention relates to polyisocyanate compositions comprising (a) polyisocyanate, and (b) a monomeric carbodiimide. The polyisocyanate compositions are particularly useful in phenolic urethane foundry binder systems. The invention also relates to foundry mixes prepared with (a) a phenolic urethane binder containing the polyisocyanate composition, and (b) a foundry aggregate, as well as foundry shapes prepared by the no-bake and cold-box processes, which are used to make metal castings.

17 Claims, No Drawings

POLYISOCYANATE COMPOSITIONS AND THEIR USE

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to polyisocyanate compositions comprising (a) polyisocyanate, and (b) a monomeric carbodiimide. The polyisocyanate compositions are particularly useful in phenolic urethane foundry binder systems. The invention also relates to foundry mixes prepared with (a) a phenolic urethane binder containing the polyisocyanate composition, and (b) a foundry aggregate, as well as foundry shapes prepared by the no-bake and cold-box processes, which are used to make metal castings.

(2) Description of the Related Art

One of the major processes used in the foundry industry for making metal parts is sand casting. In sand casting, disposable foundry shapes (usually characterized as molds and cores) are made by shaping and curing a foundry binder system that is a mixture of sand and an organic or inorganic binder. The binder is used to strengthen the molds and cores.

Two of the major processes used in sand casting for making molds and cores are the no-bake process and the cold-box process. In the no-bake process, a liquid curing agent is mixed with an aggregate and shaped to produce a cured mold and/or core. In the cold-box process, a gaseous curing agent is passed through a compacted shaped mix to produce a cured mold and/or core. Phenolic urethane binders, cured with a gaseous tertiary amine catalyst, are often used in the cold-box process to hold shaped foundry aggregate together as a mold or core. See for example U.S. Pat. No. 3,409,579. The phenolic urethane binder system usually consists of a phenolic resin component and polyisocyanate component which are mixed with sand prior to compacting and curing to form a foundry binder system.

Among other things, the binder must have a low viscosity, be gel-free, remain stable under storage and use conditions, and cure efficiently. The foundry binder system made by mixing sand with the binder must have adequate benchlife or the mix will not shape and cure properly. The cores and molds made with the binders must have adequate tensile strengths under normal and humid conditions, and release effectively from the pattern. Binders which meet all of these requirements are not easy to develop.

One of the problems associated with using phenolic urethane binders is that the polyisocyanate component is known to react with even minor amounts of water, which might come from the moisture in air during handling or use, raw materials, and particularly from exposure to atmospheric conditions when used during hot and humid summer months. Hydrolysis of the polyisocyanate results in formation of urea compounds, which degrade the performance of the binder and results in the formation of sludge during storage. This reaction with moisture can cause an increase of the viscosity of the polyisocyanate component and seriously impede the performance of the binder when it is used to bond a foundry aggregate.

All citations referred to under this description of the "Related Art" and in the "Detailed Description of the Invention" are expressly incorporated by reference.

BRIEF SUMMARY OF THE INVENTION

This invention relates to a polyisocyanate composition comprising:

(1) a polyisocyanate;

(2) a monomeric carbodiimide in an amount effective in improving the humidity resistance of the polyisocyanate.

The invention also relates to the use of the polyisocyanate compositions in phenolic urethane binder systems curable with a catalytically effective amount of an amine curing catalyst comprising:

A. a phenolic resin component; and

B. a polyisocyanate component comprising in admixture:
(1) an organic polyisocyanate;
(2) a non reactive organic solvent; and
(3) an effective amount of an monomeric carbodiimide.

The foundry binder systems are preferably used to make molds and cores, preferably by the cold-box process which involves curing the molds and cores with a gaseous tertiary amine. The cured molds and cores are used to cast ferrous and non ferrous metal parts.

The addition of the monomeric carbodiimide to the polyisocyanate component improves the shelf storage stability of the polyisocyanate by retarding an increase in viscosity and potential precipitation. As a result, the binder can be effectively used without causing a degradation in the tensile strengths of foundry shapes, e.g. cores and molds, made with the binder. The improved humidity resistance is particularly important during the hot summer months.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed.

The polyisocyanate compositions are used to prepare the polyisocyanate component of a phenolic urethane foundry binder. The polyisocyanate component of the foundry binder typically comprises a polyisocyanate, typically an organic polyisocyanate, and organic solvent, where the amount of organic solvent typically ranges from about 0 weight percent to about 50 weight percent, based on the weight of the polyisocyanate. The polyisocyanate has a functionality of two or more, preferably 2 to 5. It may be aliphatic, cycloaliphatic, aromatic, or a hybrid polyisocyanate. Mixtures of such polyisocyanates may be used. Also, it is contemplated that blocked polyisocyanates, prepolymers of polyisocyanates, and quasi prepolymers of polyisocyanates can be used. Optional ingredients such as release agents and benchlife extenders may also be used in the polyisocyanate hardener component.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanate is used in a liquid form. Solid or viscous polyisocyanate must be used in the form of organic solvent solutions. In general, the solvent concentration for the polyisocyanate may be as much as 80% by weight based on the weight of the polyisocyanate, preferably in the range of 20% to 50%.

The polyisocyanate component contains a monomeric carbodiimide, which is. Preferably used are monomeric carbodiimide compounds represented by the general formula $R_1$—N=C=N—$R_2$ wherein $R_1$ and $R_2$ are each selected from hydrogen; alkyl groups such as methyl, ethyl, propyl, isopropyl, butyl, isobutyl, pentyl, 2-methylbutyl, hexyl, heptyl, octyl, 2-ethylhexyl, nonyl, decyl, undecyl, dodecyl and the like; alkenyl groups such as propenyl, butenyl, isobutenyl, pentenyl 2-ethylhexenyl, octenyl and the like; cycloalkyl groups such as cyclopentyl, cyclohexyl, methylcyclopentyl, ethylcyclopentyl and the like; aryl groups such as phenyl, naphthyl and the like; alkyl substituted aryl groups such as alkyl substituted phenyl groups for example toluyl, isopropylphenyl, diisopropylphenyl, triisopropylphenyl, nonylphenyl and the like; aralkyl groups such as benzyl, tolyl, mesityl and the like.

Examples of monomeric carbodiimides include N,N'-diisopropyl-carbodiimide, N,N'-di-n-butyl-carbodiimide, N-methyl-N'-tert-butyl-carbodiimide, N,N'-dicyclohexyl-monomeric, N,N'-diphenyl-carbodiimide, N,N'-di-p-tolyl-carbodiimide and N,N'-4,4'-didodecyl-diphenyl-carbodiimide, N,N'-1,3-di-tert-butyl carbodiimide; N1-[3-(dimethylamino)poropyl]-3-N',-ethyl carbodiimide; N,N'-(2,2'-diethyl-di-phenyl)carbodiimide; N,N'-(2,2'-di-isopropyl-diphenyl)carbodiimide; N,N'-(2,2'-diethoxy-diphenyl)carbodiimide; N,N'-(2,6,2'6'-tetra-ethyl-diphenyl)carbodiimide; N,N'-(2,6,2',6'-tetraisopropyl-di-phenyl)carbodiimide; N,N'(2,6,2',6'-tetraethyl-3,3'-dichloro-diphenyl)carbodiimide; N,N'(2,2'-diethyl-6,6'-dichloro-diphenyl)carbodiimide; N,N'(2,6,2',6'-tetra-isobutyl-3,3'-dinitro-diphenyl)carbodiimide; and N,N'(2,4,6,2'4',6'-hexaisopropyl-diphenyl)carbodiimide.

The most preferred monomeric carbodiimide is N,N'-dicyclohexyl carbodiimide. The amount of monomeric carbodiimide used in the binder is from 0.1 to 5.0 weight percent based upon the isocyanate component of the binder, preferably from 0.1 to 1.0 weight percent The phenolic resole resin used in the phenolic urethane binder is preferably prepared by reacting an excess of aldehyde with a phenol in the presence of either an alkaline catalyst or a metal catalyst. The phenolic resins are preferably substantially free of water and are organic solvent soluble. The preferred phenolic resins used in the subject binder compositions are well known in the art, and are specifically described in U.S. Pat. No. 3,485,797 which is hereby incorporated by reference. These resins, known as benzylic ether phenolic resole resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols use to prepare the phenolic resole resins include any one or more of the phenols which have heretofore been employed in the formation of phenolic resins and which are not substituted at either the two ortho-positions or at one ortho-position and the para-position. These unsubstituted positions are necessary for the polymerization reaction. Any of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3, 4-trimethyl phenol, 3-ethyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-tertiary butyl phenol, and p-phenoxy phenol. multiple ring phenols such as bisphenol A are also suitable.

The aldehyde used to react with the phenol has the formula RCHO wherein R is a hydrogen or hydrocarbon radical of 1 to 8 carbon atoms. The aldehydes reacted with the phenol can include any of the aldehydes heretofore employed in the formation of phenolic resins such as formaldehyde, acetaldehyde, propionaldehyde, furfuraldehyde, and benzaldehyde. The most preferred aldehyde is formaldehyde.

The phenolic resin used must be liquid or organic solvent-soluble. The phenolic resin component of the binder composition is generally employed as a solution in an organic solvent. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution and preferably in the range of 20% to 80%.

Those skilled in the art will know how to select specific solvents for the phenolic resin component, and in particular the solvents required in the polyisocyanate component. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanate, are less compatible with the phenolic results. It is, therefore, preferred to employ combinations of solvents and particularly combinations of aromatic and polar solvents.

Examples of aromatic solvents include xylene and ethylbenzene. The aromatic solvents are preferably a mixture of aromatic solvents that have a boiling point range of 125° C. to 250° C. The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

In general the ratio of isocyanato groups of the polyisocyanate to the hydroxyl groups of the phenolic resin is from 1.25:1 to 1:1.25, preferably about 1:1. Expressed as weight percent, the amount of polyisocyanate used is from 10 to 500 weight percent, preferably 20 to 300 weight percent, based on the weight of the phenolic resin.

A useful optional component for the binder is a natural oil. The natural oil can be added to the phenolic resin component, isocyanate component, or both, preferably to the isocyanate component. Compatible natural oils are highly preferred. A natural oil is considered to be compatible with the organic isocyanate and/or phenolic resin if the mixture does not separate into two phases at room temperature, and preferably will not separate at temperatures between 30° C. to 0° C. Natural oils include unmodified natural oils as well as their various known modifications, e.g., the heat bodied air-blown, or oxygen-blown oils such as blown linseed oil and blown soybean oil. They are generally classified as esters of ethylenically unsaturated fatty acids. Preferably the viscosity of the natural oil is from A to J on the Gardner Holt viscosity index, more preferably from A to D, and most preferably A to B. Preferably the acid value of the natural oil is from about 0 to about 10, more preferably about 0 to about 4, and most preferably about 0 to about 2 as measured by the number of milligrams of potassium hydroxide needed to neutralize a 1 gram sample of the natural oil.

The natural oils are used in the phenolic resin component, isocyanate component, or both in an effective amount sufficient to improve the tensile strength of the foundry shapes made with the binders. This amount will generally range from about 1 percent by weight to about 15 percent by weight, most preferably about 2 percent to about 10 percent by weight, based upon the weight of the isocyanate component. Typically less amounts of natural oil are used in the phenolic resin component, generally from about 1 percent by weight to about 5 percent by weight, most preferably about 1 percent to about 3 percent by weight, based upon the weight of the phenolic resin component.

In addition, the solvent component can include drying oils such as disclosed in U.S. Pat. No. 4,268,425. Such drying oils include glycerides of fatty acids which contain two or more double bonds. Also, esters of ethylenically unsaturated fatty acids such as tall oil esters of polyhydric alcohols or monohydric alcohols can be employed as the drying oil. In addition, the binder may include liquid dialkyl esters such as dialkyl phthalate of the type disclosed in U.S. Pat. No. 3,905,934 such as dimethyl glutarate, dimethyl succinate; and mixtures of such esters.

The binder may also contain a silane (typically added to the phenolic resin component) having the following general formula:

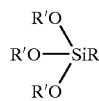

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The silane is preferably added to the phenolic resin component in amounts of 0.01 to 2 weight percent, preferably 0.1 to 0.5 weight percent based on the weight of the phenolic resin component.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like. Although the aggregate employed is preferably dry, it can contain minor amounts of moisture.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

The binder compositions are preferably made available as a two-package system with the phenolic resin component in one package and the polyisocyanate component in the other package. Usually, the phenolic resin component is first mixed with sand and then the polyisocyanate component is added. Methods of distributing the binder on the aggregate particles are well-known to those skilled in the art.

The foundry binder system is molded into the desired shape, such as a mold or core, and cured. Curing by the cold-box process is carried out by passing a volatile tertiary amine, preferably triethyl amine, through the shaped mix as described in U.S. Pat. No. 3,409,579. Curing by the no-bake process is takes place by mixing a liquid amine curing catalyst into the foundry binder system, shaping it, and allowing it to cure.

Useful liquid amines have a pKb value generally in the range of about 7 to about 11. Useful liquid amines have a $pK_b$ value generally in the range of about 5 to about 11. Specific examples of such amines include 4-alkyl pyridines, isoquinoline, arylpyridines, 1-vinylimidazole, 1-methylimidazole, 1-methylimidazole, and 1,4-thiazine. Preferably used as the liquid tertiary amine catalyst is an aliphatic tertiary amine, particularly (3-dimethylamino) propylamine. In general, the concentration of the liquid amine catalyst will range from about 0.2 to about 5.0 percent by weight of the phenolic resin, preferably 1.0 percent by weight to 4.0 percent by weight, most preferably 2.0 percent by weight to 3.5 percent by weight based upon the weight of the phenolic resin component.

The following abbreviations and components are used in the Examples:

ABBREVIATIONS

The following abbreviations are used:

BOB = based on binder.
DCC = N,N'-dicyclohexyl carbodiimide.
ISOCURE ® 397C/679 C binder = a phenolic urethane cold box foundry binder, sold by Ashland Specialty Chemical Company, a division of Ashland Inc.,

|  |  |
|---|---|
| ISOCURE ® 408/808 binder = | a phenolic urethane cold box foundry binder, manufactured by Ashland Specialty Chemical Company comprising ISOCURE 408 phenolic resin component and ISOCURE 808 polyisocyanate component. |
| RH = | relative humidity. |

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

Comparative Examples A, B, and Examples 1–4

Effect of DCC on Shelf Stability of ISOCURE 697 and 808 Polyisocyanate Components ISOCURE 697 and 808 are the polyisocyanate components of phenolic urethane binders sold by Ashland Specialty Chemicals Company, a division of Ashland Inc. They comprise a polymeric diphenylmethylene diisocyanate having a functionality of about 2.2 and solvents in an approximate ratio of 2:1. They do not contain DCC and were used as the Controls. ISOCURE 697 polyisocyanate component was used in the Comparative Example A and in Examples 1–2. ISOCURE 808 polyisocyanate component was used as Comparative Example B and in Examples 3–4. The tests were conducting by adding various amounts of DCC (expressed as weight percent based on the binder) to the Controls, as indicated in Table I, and exposing the solutions to 50% RH at 25° C. The results are set forth in Table I.

Table I shows that the addition of DCC at 0.4 and 1.0% by weight into the polyisocyanate component of a phenolic urethane binder improved the shelf storage stability of the polyisocyanate component. This improvement is particular significant during the hot and humid summer months, where moisture is more prevalent and may degrade the polyisocyanate component more rapidly.

Comparative Examples C, D, and Examples 5–8

Effect on Tensile Strengths of Cores Made with Binder Containing DCC

Test cores were made with ISOCURE 397C/697C and ISOCURE 408/808 as Controls, and with test cores where the polyisocyanate component of the binder contained DCC at various levels (as weight percent BOB), as indicated in Table II. ISOCURE 397C/697C was used in Comparative Example C, and in Examples 5–6, which used DCC in the binder. ISOCURE 408/808 was used in Comparative Example D, and in Examples 7–8, which used DCC in the binder.

The resin component, and then the polyisocyanate component, were mixed with 1L-5W grade lake sand, such that the weight ratio of resin component to polyisocyanate component was 55/45 and the binder level was 1.2 weight percent. The resulting foundry mixes were forced into a dogbone-shaped corebox by blowing it into the corebox. The shaped mix in the corebox is then contacted with trethyl amine (TEA) at 20 psi for 1 second, followed by a 6 second nitrogen purge at 40 psi., thereby forming AFS tensile strength samples (dog bones) using the standard procedure.

The laboratory temperature was 24° C. and the relative humidity (RH) was 64%. The temperature of the constant temperature room (CT) was 25° C. and the relative humidity was 50%.

The tensile strengths of the test cores made according to the examples were measured on a Thwing Albert Intellect II instrument. Tensile strengths were measured on freshly mixed sand. In order to check the resistance of the test cores to degradation by humidity, the test cores were stored in a humidity chamber for 24 hours at a humidity of 90 percent relative humidity. The results are set forth in Table II.

Measuring the tensile strength of the test core enables one to predict how the mixture of sand and phenolic urethane binder will work in actual foundry operations. Lower tensile strengths for the test cores indicate that the phenolic resin and polyisocyanate reacted more extensively prior to curing and/or that the cores degraded due to humidity.

TABLE I

Effect of DCC on the shelf stability of isocyanate component

| Example | DCC (wt %) | Day 1 | Day 3 | Day 7 |
|---|---|---|---|---|
| A | 0.0 | Clear/clean | Hazy, 25% precipitation | Cloudy, 75% precipitation |
| 1 | 0.4 | Clear/clean | Slighty cloudy, 5% precipitation | Cloudy, 41% precipitation |
| 2 | 1.0 | Clear/clean | Clear/clean, 0% precipitation | Cloudy, 12% precipitation |
| B | 0.0 | Clear/clean | Cloudy, 21% precipitation | Cloudy, 57% precipitation |
| 3 | 0.4 | Clear/clean | Slightly cloudy, 2% precipitation | Cloudy, 21% precipitation |
| 4 | 1.0 | Clear/clean | Clear/clean, 0% precipitation | Slightly cloudy, 5% precip. |

TABLE II (Effect of DCC on Sand Tensile Strength Performance)

| | | Sand Tensile Strength (psi) | | | | | | |
|---|---|---|---|---|---|---|---|---|
| | DCC | ←←←←Zero-bench life→→→→ | | | | | 3 hrs. bench life | |
| Example | (wt %) | Imm. | 5 min. | 1 hr | 24 hr. | 24 hr + 90% RH | Imm. | 24 hrs |
| C | 0.0 | 107 | 164 | 231 | 254 | 96 | 117 | 172 |
| 5 | 0.4 | 113 | 169 | 218 | 214 | 108 | 126 | 175 |
| 6 | 1.0 | 96 | 196 | 253 | 225 | 104 | 116 | 181 |
| D | 0.0 | 88 | 155 | 223 | 205 | 126 | 105 | 196 |
| 7 | 0.4 | 100 | 178 | 199 | 222 | 149 | 108 | 178 |
| 8 | 1.0 | 92 | 159 | 200 | 190 | 162 | 95 | 159 |

The data in Table II demonstrate that the addition of DCC at levels of 0.4 and 1.0% into the polyisocyanate component of ISOCURE 397C/697 binder and ISOCURE 408/808 binder did not adversely affect the sand tensile strength performance of sand mixes molded immediately upon mixing (zero benchlife), or the sand mixes used three hours after mixing (3 hours bench life). The data in Table II (see bolded column) further illustrates that the addition of DCC into the binder improved the binder' humidity resistance. This indicates that DCC can be used in phenolic urethane binders without adversely affecting the tensile strengths of cores and molds prepared with the binder containing DCC.

We claim:

1. A polyisocyanate composition comprising a mixture of:
   (1) a polyisocyanate that does not contain carbodiimide linkages; and
   (2) a monomeric carbodiimide in amount effective in improving the humidity resistance of the polyisocyanate.

2. The polyisocyanate composition of claim 1 wherein the polyisocyanate is polymeric diphenylmethylene diisocyanate.

3. The polyisocyanate composition of claim 2 wherein the monomeric carbodiimide is selected from the group consisting of N,N'-dicyclohexyl carbodiimide, N,N'-diisopropyl carbodiimide, N,N'-ditert-butyl carbodiimide, N,N'-di-p-tolyl carbodiimide, and mixtures thereof.

4. The polyisocyanate composition of claim 3 wherein the amount of monomeric carbodiimide is from 0.1 weight percent to 5.0 weight percent, based upon the weight percent of the isocyanate component.

5. A foundry binder system comprising:
   A. a phenolic resin component; and
   B. a polyisocyanate component comprising:
      (1) an organic polyisocyanate that does not contain carbodiimide linkages;
      (2) a non reactive organic solvent; and
      (3) a monomeric carbodiimide in amount effective in improving the humidity resistance of the polyisocyanate.

6. The foundry binder system claim 5 wherein the phenolic resin component comprises a (a) a polybenzylic ether phenolic resin prepared by reacting an aldehyde with a phenol such that the molar ratio of aldehyde to phenol is from 1.1:1 to 3:1 in the presence of a divalent metal catalyst, and (b) a solvent in which the resole resin is soluble.

7. The foundry binder system of claim 6 wherein the phenol is selected from the group consisting of phenol, o-cresol, p-cresol, substituted phenols, and mixtures thereof.

8. The foundry binder system of claim 7 wherein the aldehyde is formaldehyde.

9. The foundry binder system of claim 8 wherein the ratio of hydroxyl groups of the polybenzylic ether phenolic resin to the polyisocyanate groups of the polyisocyanate hardener is from 0.80:1.2 to 1.2:0.80.

10. The foundry binder system of claim 5 where the monomeric carbodiimide is selected from the group consisting of N,N'-dicyclohexyl carbodiimide, N,N'-diisopropyl carbodiimide, N,N'-ditert-butyl carbodiimide, N,N'-di-p-tolyl carbodiimide, and mixtures thereof.

11. The foundry binder system of claim 10 wherein the amount of monomeric carbodiimide is from 0.1 weight percent to 5.0 weight percent, based upon the weight of the isocyanate component.

12. A foundry mix comprising:
   A. a major amount of an aggregate; and
   B. an effective bonding amount of the binder system of claims 5, 6, 7, 8, 9, 10, or 11.

13. A process for preparing a foundry shape which comprises:
   (a) forming a foundry mix as set forth in claim 12;
   (b) forming a foundry shape by introducing the foundry mix obtained from step (a) into a pattern;
   (c) contacting the shaped foundry binder system with a tertiary amine catalyst; and
   (d) removing the foundry shape of step (c) from the pattern.

14. The process of claim 13 wherein the tertiary amine catalyst is a gaseous tertiary amine catalyst.

15. The process of claim 14 wherein the amount of said binder composition is about 0.6 percent to about 5.0 percent based upon the weight of the aggregate.

16. The process of claim 15 wherein the tertiary amine catalyst is a liquid tertiary amine catalyst.

17. The process of casting a metal molded article which comprises:
   (a) preparing a foundry shape in accordance with claim 16;
   (b) pouring said metal while in the liquid state into and around said shape;
   (c) allowing said metal to cool and solidify; and
   (d) then separating the molded article.

* * * * *